United States Patent
Darra et al.

(10) Patent No.: US 10,988,050 B2
(45) Date of Patent: Apr. 27, 2021

(54) SECTION INSULATING DEVICE AND USE OF SAME

(71) Applicant: Kummler + Matter AG, Zürich (CH)

(72) Inventors: Dennis Darra, Oberengstringen (CH); Simon Geiger, Richterswil (CH); Rolf Staubli, Lommiswil (CH)

(73) Assignee: KUMMLER + MATTER AG, Zürich (CH)

( * ) Notice: Subject to any disclaimer, the term of this patent is extended or adjusted under 35 U.S.C. 154(b) by 0 days.

(21) Appl. No.: 16/346,225

(22) PCT Filed: Jul. 10, 2018

(86) PCT No.: PCT/EP2018/068607
§ 371 (c)(1),
(2) Date: Apr. 30, 2019

(87) PCT Pub. No.: WO2019/029925
PCT Pub. Date: Feb. 14, 2019

(65) Prior Publication Data
US 2020/0276912 A1 Sep. 3, 2020

(30) Foreign Application Priority Data

Aug. 9, 2017 (EP) .................................. 17185568

(51) Int. Cl.
*B60M 1/18* (2006.01)
*B60M 1/20* (2006.01)
(Continued)

(52) U.S. Cl.
CPC ................ *B60M 1/18* (2013.01); *B60M 1/20* (2013.01); *B60M 1/24* (2013.01); *B60M 1/307* (2013.01)

(58) Field of Classification Search
CPC . B60M 1/02; B60M 1/18; B60M 1/24; B60M 1/20; B60M 1/307; H01B 9/008; H01B 17/02
See application file for complete search history.

(56) References Cited

U.S. PATENT DOCUMENTS

| 529,616 | A | * | 11/1894 | Hennefeld et al. | ...... B60M 1/18 191/39 |
| 1,019,451 | A | * | 3/1912 | Gillette | ...... B60M 1/18 191/39 |

(Continued)

FOREIGN PATENT DOCUMENTS

| CN | 201371753 Y | 12/2009 |
| CN | 201753028 U | 3/2011 |

(Continued)

OTHER PUBLICATIONS

International search report for patent application No. PCT/EP2018/068607 dated Sep. 25, 2018.

*Primary Examiner* — Zachary L Kuhfuss
(74) *Attorney, Agent, or Firm* — Nixon & Vanderhye

(57) ABSTRACT

A section disconnect device for a contact line assigned in particular to railborne vehicles as overhead line and carrying high voltage, having a single section arrangement (10) with multiple line sections extending, such that it is tensioned or can be tensioned, between two contact-wire connecting heads (12, 14) and provided with insulator means (36, 38), which line section arrangement is constructed such that it can be mounted by means of respective accommodating sections (66) of the contact-wire connecting heads in an electrically and mechanically contacting manner between exposed ends (16, 18) of the contact line, as a result of which at least one of the contact-wire connecting heads (12, 14) has adjustable level equalization means (66, 68, 70) for interacting with a head-side end (20, 24) of the line section (Continued)

arrangement (10), which are constructed in such a manner that, with respect to a current collector contact, in particular a current-collector-contact side of the contact line and/or a current-collector-contact plane, the free end of the contact line can be brought into a common plane with the end of the line section arrangement and/or seamlessly aligned with the same.

14 Claims, 3 Drawing Sheets

(51) Int. Cl.
  B60M 1/30 (2006.01)
  B60M 1/24 (2006.01)

(56) References Cited

U.S. PATENT DOCUMENTS

| | | | | |
|---|---|---|---|---|
| 1,249,359 A | * | 12/1917 | Ely | B60M 1/18 191/39 |
| 1,530,467 A | * | 3/1925 | Bower | B60M 1/18 191/39 |
| 1,895,581 A | * | 1/1933 | Matthes | B60M 1/24 191/38 |
| 4,250,982 A | * | 2/1981 | Senften | B60M 1/18 191/39 |
| 4,350,851 A | * | 9/1982 | Seddon | B60M 1/18 191/39 |
| 4,424,889 A | * | 1/1984 | Hockele | B60M 1/18 191/39 |
| 4,825,987 A | | 5/1989 | Seddon | |
| 2019/0126776 A1 | * | 5/2019 | Micheli | B60M 1/307 |

FOREIGN PATENT DOCUMENTS

| | | |
|---|---|---|
| DE | 883617 C | 7/1953 |
| RU | 2401751 C1 | 10/2010 |

* cited by examiner

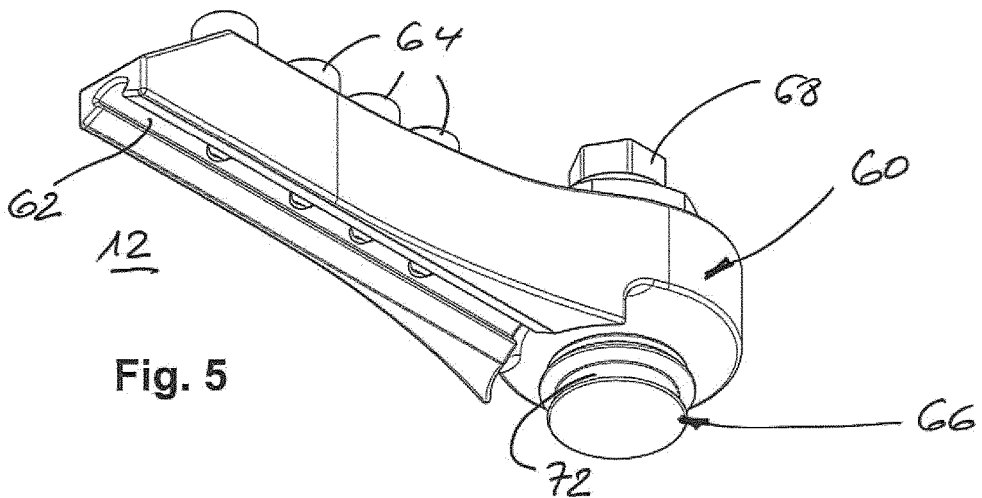
Fig. 5
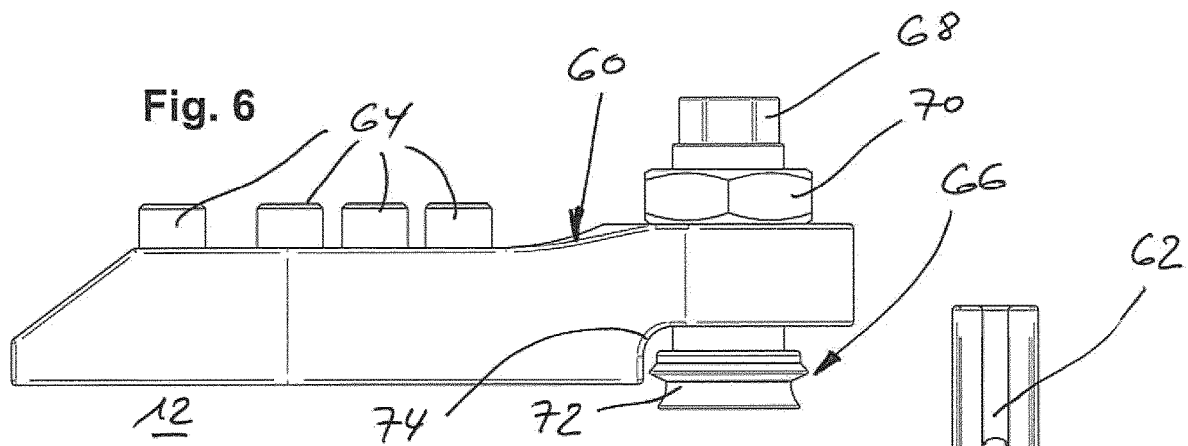
Fig. 6
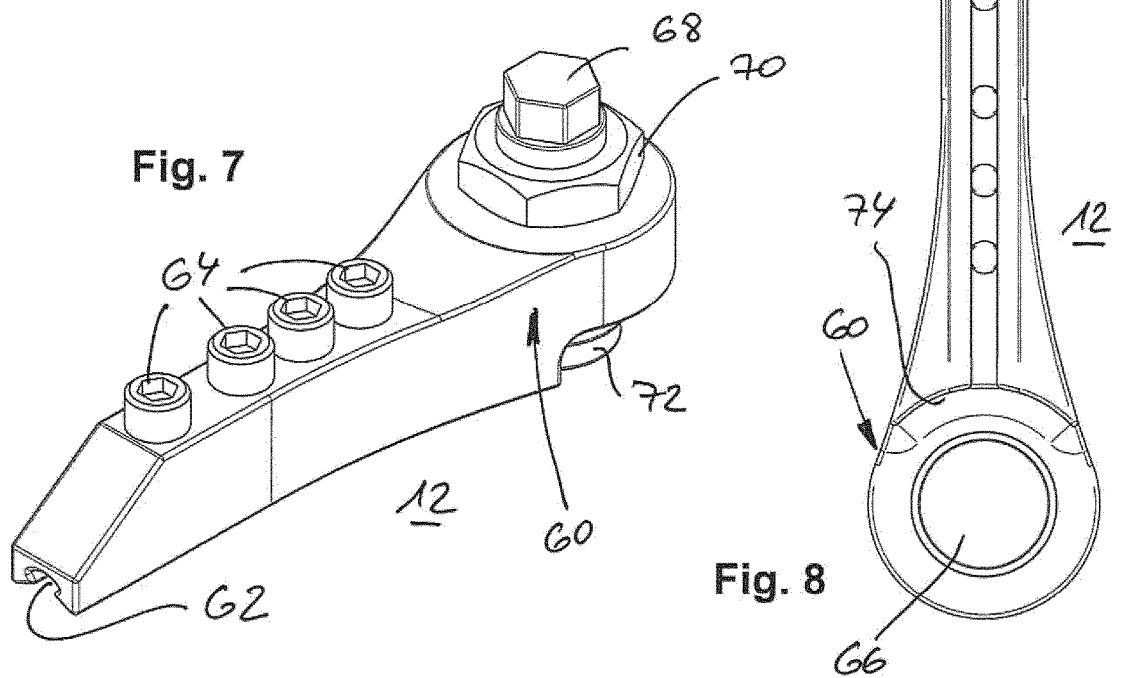
Fig. 7
Fig. 8

SECTION INSULATING DEVICE AND USE OF SAME

BACKGROUND OF THE INVENTION

The present invention relates to a section disconnect device. Devices of this type are generally known from the prior art and are used for disconnecting a contact line—typically realized as a high-voltage carrying overhead line for rail vehicles—in a tension-resistant and at the same time electrically insulated manner. A section disconnect of this type therefore creates sectors of an overhead-line system, which in each case have a separate (high-voltage) energy supply, with the option, for maintenance purposes for example, to switch off individual sectors of an overhead-line or contact-line system by deactivating the supply. In this case, a contact-line length of such a sector, which is disconnected from an adjacent sector by means of a section disconnect device, may be less than 1 km, or else have a length in the double-digit kilometre range, depending on the actual local configuration of the contact-line network and corresponding requirements.

A corresponding section disconnect device, in which a contact wire is kinked by a terminal, is known for example from CN 201 371 753 Y.

Whilst it is traditionally known from the prior art to configure a section disconnect device, in addition to insulator means which are to be provided in a suitable manner, with the aid of elongated rails or runners extending along a contact-line direction, it may likewise be assumed to be known to realize the section disconnect device in the manner of the preamble by means of a line section arrangement, namely usually from a plurality of single line sections running parallel to one another at least in sections, which single line sections are in each case realized in a contact-line wire material and then typically have a suitably high-voltage resistant insulator looped in each single line sections in an interrupting manner. A mechanical and electrical coupling to the contact line, more precisely two mutually opposite exposed ends of the contact line, which are to be connected by means of the generic section disconnect device, usually takes place in the form of contact-wire connection heads, which in each case accommodate an assigned to one of the exposed ends and then connect the same—mechanically and electrically—to the line section arrangement, which typically allows a corresponding fanning out of the arrangement to produce the plurality of single line sections.

Depending on the configuration of such a section device, which is generally known and assumed to form the generic type, this is suitable for a multiplicity of use purposes, in particular for realizing high-voltage overhead-line systems of railborne vehicles, wherein driving voltages to be transmitted therewith may typically be up to 27 kV as AC voltage.

In view of the increasingly rising driving speeds of the vehicles to be loaded with driving voltage using an overhead-line system, it constitutes a particular challenge to configure the section disconnect device interrupting the contact line in particular in such a manner that although this realizes its electrical disconnect or insulator function of the respective connected exposed ends in the required manner, it on the other hand acts as seamlessly and homogeneously as possible in terms of the sliding or tapping behaviour of contacting current collectors of the relevant vehicles. A problem of this type is known in particular in connection with conventional conductor sections, which are rigid in sections, in the form of the known rails or runners on the section insulator: The sliding interaction with a current collector moving (due to the vehicle movement) for a typical average contact force of 100N to 150N leads, especially in the case of high pickup speeds, to dynamic effects in the form of pulse loading, impacts, vibrations and the like of the section disconnect device, with the disadvantageous consequence of (punctiform) tearing down of the contact, sparking, undesired electric arcs, additional wear due to contact bounce or the like. Effects of this type are complex and can only be overcome with difficulty, not least owing to the various possible pickup speeds.

With respect to this, contact-wire terminals with an adjusting device for sections insulators with profile curves are known from the prior art, as described for example in DE 883 617 B.

A similar effect occurs if, instead of the known rail- or runner-based section disconnect devices, these form a line section arrangement realized by (overhead) line wiring section. These are, owing to their realization with a wire material of the contact line (or a wire material which is similar or comparable in terms of properties), inherently more elastic and less susceptible for the described disadvantageous (upward) swinging and colliding, and at the same time in this case they cause an inhomogeneous stepping or transition problem in the region of the respective contact-wire connection heads (at which the free end of the contact line on one side is fanned out into a plurality of contact-wire wiring line of the generic section disconnect device), not least when, to produce the required mechanical tensile stability for minimized electrical contact resistances, the respective wire ends must be enclosed completely. Here also, the section insulator is hard, potentially inflexible, at least in the region of the contact-wire connection heads and tends, owing to unavoidable steps, (particularly in a slider plane decisive for the current collection) due to pulses to sparking in connection with disadvantageous wear both at the section insulator and at the vehicle current collector.

During everyday operation of generic section disconnect devices, this means that a service life of current technology according to previous experience of only slightly more than 100 000 sliding operations (i.e. current-collecting passes of a vehicle current collector systems) is tolerated until maintenance of the system, if appropriate with replacement of the section disconnect device or individual subassemblies. Highly frequented overhead-line sections sometimes reach up to 250 000 sliding operations or more annually, so that a current service life between maintenance intervals of generic section disconnect technologies may be significantly less than one year.

SUMMARY OF THE INVENTION

Against the background that maintenance (just like initial mounting) of a section disconnect device owing to the contact-voltage interruption necessary therefor, connected with an interruption of the operating time of a rail vehicle, typically takes place during the night and therefore with artificial light, in addition to the discussed pickup properties to be improved and suitable for high speed and disadvantageous pulse-swing and sparking effects to be prevented, the object is in particular also based on minimizing wear in the voltage collector, and thus to increase maintenance intervals and, in the case of maintenance, component replacement or initial mounting, reducing the required outlay for such an intervention in the contact-line system, particularly in the form of a (significant) reduction of the mounting and interruption time in the relevant contact-line system.

The object is achieved by means of the section disconnect device with the features disclosed herein; advantageous developments of the invention are also described herein.

In an advantageous manner according to the invention, at least one of the contact-wire connecting heads is configured in such a manner that it permits level equalization—in an adjustable manner—such that the free end of the contact line (held by the relevant contact-wire connecting head) can be brought, with respect to a current-collector contact or a plane of the current-collector contact, to a common plane with the end of the line section arrangement (likewise fastened to the relevant contact-wire connecting head), wherein this can take place in a particularly preferred inventive manner in the form of a seamless alignment.

As a result, the present invention first advantageously means that the at least one contact-wire connecting head realized in the manner according to the invention does not form a step or impact point (creating an undesired pulse or the similar dynamic effect), but rather a current collector of an interacting vehicle slides, even at high pickup speeds, practically seamlessly and therefore in a trouble-free manner over this contact point.

In addition, the dynamic behaviour of the section disconnect device is improved by the present invention in that the present invention is realized in a rail-less and runner-less manner by means of the line section arrangement, in other words, the wiring lines are all realized in a contact-wire or contact-line material, act in a correspondingly elastic and damping manner, so that in particular the disadvantageous upward swinging of traditional rigid runner or rail structures does not occur.

In addition, this effect is supported by the measured according to the invention of constructing the provided end of the line section arrangement as a continuous diverted line section (and therefore as a continuously extended section made from a contact wire material), wherein, preferably, this diverted section is guided around a roller (alternatively a circular or ring section) of the level equalization means for forming a spread. Initially, this effects an obvious simplification of the constructive realization, as even two single lines of the line section arrangement can be realized using one single continuous line section, which is diverted according to the invention, at least up to an insulator which is then to be provided in a respective single line). In addition, this diverted end of the line section arrangement offers a significant mounting advantage of the section disconnect device, namely in that for mounting (unmounting) this diverted end only has to be laid around the roller or the circular or ring section, in order, in this respect, to mount the section disconnect device (with contact-wire connecting head already fixed to the assigned exposed end of the contact wire). For this purpose, the roller or the circular or ring section is provided with an accommodation for the diverted line section in such a manner that the same is held, for example with a horizontally arranged roller and corresponding prestress of the wire material of the diverted line section, on the roller or the circular or ring section and protected from falling down.

For further simplification of the mounting, the invention then provides according to a development to configure the level equalization means provided anyway for adjusting the roller or the circular or ring section in such a manner that this roller or circular or ring section can be adjusted along a plane preferably perpendicular to the common plane (that is to say in a plane of the contact line and the line section arrangement, corresponding in this respect to a plane of the current collector contact) and even more preferably between an accommodation position provided in a body of the contact-wire connecting head, at which the diverted line section cannot be removed or fall off, and a mounting position, typically outside the overlap with the body of the contact-wire contact-wire connection, at which the mount of the end of the line section arrangement (constructed as diverted line section) can be mounted in a simple manner by folding over or hanging over.

In a particularly constructively simple manner, this functionality of the level equalization means (acting simultaneously, in the described manner according to a development, for enabling mounting or unmounting of the diverted line section at the end of the line section arrangement) realized using an adjustment technology, which can be moved along a threaded longitudinal axle in a suitable manner by means of screws and not only allows the precise adjustment for the level equalization according to the invention, but rather additionally can also be fixed in an adjustment and fastening position, for example using suitable lock nuts.

In a particularly constructively preferred manner, the contact-wire connecting head is constructed in an elongated manner such that a groove (which is preferably constructed in an undercut manner) is constructed along a direction of extent, which groove allows the insertion of the free end of the contact line, that is to say is adapted cross-sectionally in particular to an—unworn—cross-sectional contour of the contact line, which then allows detachable mechanical coupling of the contact line with the contact-wire connecting head, preferably by means of clamping screws or similar fastening means acting perpendicularly to the direction of extent.

The contact-wire connecting head, in turn preferably in the elongated form according to the development, can then, at one end, further preferably in the form of a widened section, accommodate the level equalization means according to the invention, preferably realized in the form of the screw arrangement. discussed as advantageous, with seated roller or circular or ring section and thus develop the basic principles according to the invention in a constructively simple, yet highly effective manner, which is simple to mount.

A further preferred embodiment of the invention, which develops the invention per se, but also alternatively in connection with the previously discussed exemplary embodiments, provides that high-voltage insulator means, which are constructed in an elongated manner, are looped into preferably mutually parallel running individual single line of the line section arrangement. These are preferably arranged offset to one another, with respect to a direction of extent of the line section arrangement and therefore also a direction of extent of the section disconnect device between the ends of the contact line, and in particular do not overlap, as a result of which the advantageous effect can be realized, that these high-voltage insulators (which, in accordance with the respective requirements for the contact line voltage, are configured in an otherwise conventional manner) are mounted and provided (further preferably by means of corresponding configuration of suitable connector nodes) in such a manner that the insulators lie above the common plane (of the exposed end of the contact line and end of the line section arrangement, therefore the plane of the current collector contact) and thus no disadvantageous influencing of the sliding behaviour of a current collector along the line section arrangement takes place.

For voltage compensation between the single line sections respective sides of the insulator means, according to a development, wire connections are provided in the form of a respective diagonal line section—diagonal owing to the offset, according to a development, of the high-voltage insulators along the longitudinal direction. A particularly elegant development of the diagonal line sections provides applying the same in turn continuously and in a single-stranded manner on the diverted line section or extending the same accordingly, so that in this respect, a common side of a two-stranded line section arrangement can be realized between the respective insulator means and the head-side end by means of a single continuous wire line. Particularly preferably, the connector nodes mentioned ensure not only the corresponding coupling (mechanical and electrical), these also allow a corresponding positioning of the high-voltage insulator means, advantageously above the common plane.

A further preferred embodiment of the invention provides that—preferably on respective sides of the insulator means—strut- or web-like spreading means act on a connection node in each case, which spreading means spread two individual wiring lines in a predetermined manner. Not only can the spacing of the single line section be determined (in the common plane) by means of these spreading means, these also offer the option of additional diversion of a line section opposite a connection node.

Finally, the spreading means make it possible by means of a preferably central articulation point provided between a pair of single line sections, to fasten the line section arrangement in a hanging manner on a carrier arrangement realized as a carrier wire provided above the contact wire and the section disconnect device (further preferably realized by means of hanging which is simple in terms of construction and mounting), and according to a development, the central point of action of the spreading means is used as a tilt or pivot axis for realizing a further preferably adjustable pivoting or tilting of both or only one of the single line sections. A measure of this type therefore makes it possible in a particularly constructively simple manner for example to adapt to banking or similar level changes of a rail arrangement running below the contact line, with the option of achieving a corresponding parallelism for a current collector of a vehicle travelling thereon in interaction with the (multi-line section) section device.

As a result, in a constructively surprisingly simple and elegant manner, the present invention achieves a significant improvement of the section disconnect technologies known from the prior art, not only with regards to clear wear reduction and improved damping properties (or reduced undesired vibration behaviour), also a significant reduction of the mounting time can be achieved by means of the present invention, with the possibility of mounting the contact-wire connection heads according to the invention (in each case) on exposed ends of the contact line, in order then to hang the (correspondingly premounted) line section arrangement in respective ends of the contact-wire connection heads, wherein additionally, in particular in poor lighting conditions, even the orientation and mounting work of deployed mounting personnel is simplified.

Simulations have shown that due to the realization of the present invention in a preferred field of application of an overhead-line system with driving AC voltage in the range between up to 27 kV, it is possible to increase the 100 000 to 150 000 sliding operations typically lying between maintenance intervals from the prior art in the high-speed range ideally to up to 2 000 000 sliding operations, which leads in heavily frequented travel sections to a service life of 6 to 8 years between maintenance intervals. These advantages, in connection with the explained simplified mounting and shortened mounting time, therefore lead to surprising advantages of the present invention compared to the prior art, as a result of which it is to be expected that in the future significant portions of section insulators are realized by the technology according to the invention.

BRIEF DESCRIPTION OF THE DRAWINGS

Further advantages, features and details of the invention result from the following description of preferred exemplary embodiments, as well as on the basis of the drawings. In the figures:

FIG. 5, 7 shows perspective views of the contact-wire connecting head used at both ends in the exemplary embodiments of FIG. 1 to FIG. 4;

FIG. 6 shows a side view of the contact-wire connecting head of FIG. 5, 7 and

FIG. 8 shows a bottom view onto the contact-wire connecting head.

DETAILED DESCRIPTION

Figure 1:
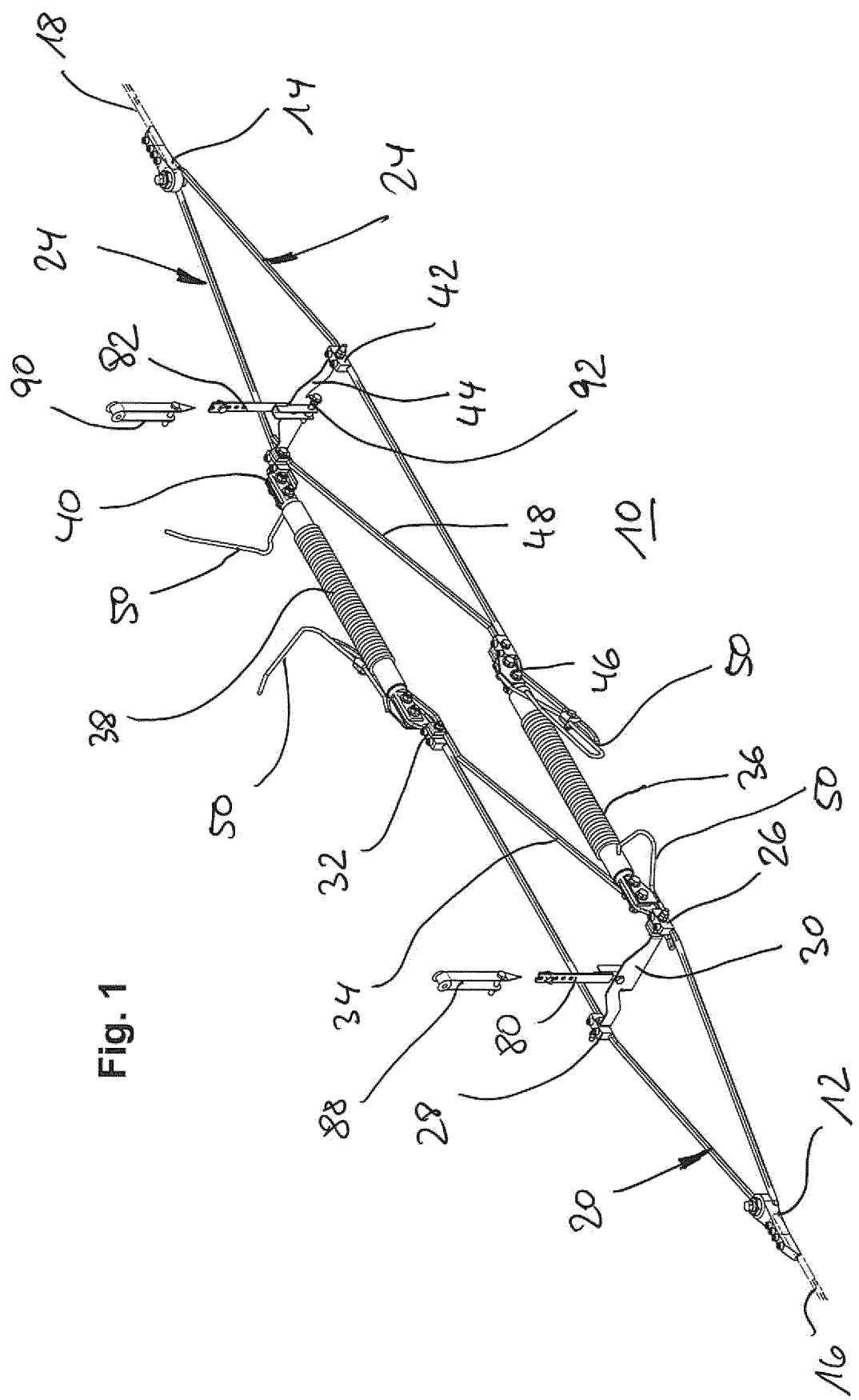
FIG. 1 shows a perspective view onto the section disconnect device according to a first exemplary embodiment of the present invention.
Figure 2:
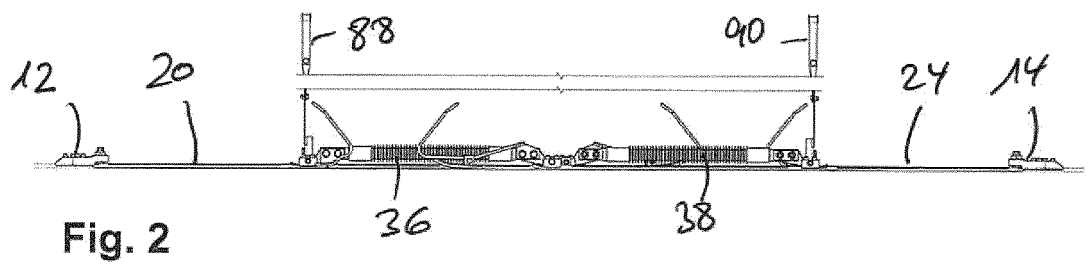
FIG. 2 shows a bottom view onto the device of the exemplary embodiment of FIG. 1.
Figure 3:
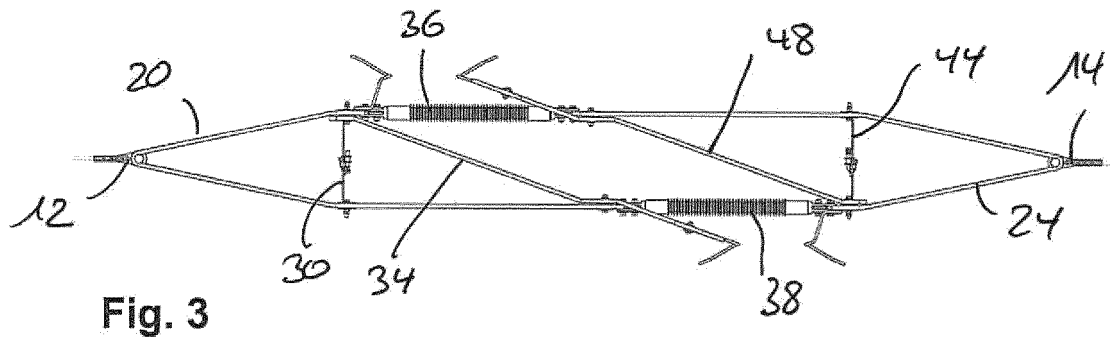
FIG. 3 shows a side view of the device according to FIG. 1, FIG. 2.

The perspective view of FIG. 1, expanded by the further views of FIGS. 2, 3 clarifies the constructive realization of the section disconnect device of a first preferred exemplary embodiment, in which a line section arrangement 10 having two mutually parallel wiring line sections is in each case connected at the end side via contact-wire connecting heads 12, 14 with associated (exposed) ends of a high-voltage contact line 16 or 18.

In the perspective view of FIG. 1, and a bleak plan view onto the arrangement takes place; FIG. 3 as side view clarifies how current collectors (not shown) at from below on the arrangement, so that the underside of FIG. 3 in this respect corresponds to a common plane, to be described in detail in the following, between the respective exposed ends 16 or 18 and a respective end of the line section arrangement 10 realized as a diverted line section 20 or 24. Actually, these respective diverted line sections are realized from a contact-wire material, as is also used for the contact wire (with ends 16, 18) interrupted by the section clamping device 10, wherein other wire configurations may also be used. In the exemplary embodiments shown, insofar as they are symmetrical, the diverted line section extends to the left-side contact-wire connecting head 12 of a first connector node 26 via a height-adjustable deflecting roller (shown in detail in the views of FIGS. 5 to 8 and to be explained in the following) of the contact-wire connecting head 12, diverted to a lateral contact end 28 (also effecting a slight angling or diversion) of a first strut unit 30 up to a second connector node 32, from where the line is then guided in the form of a diagonal section 34 back to the first connector node 26. Both connector nodes 26, 32 are configured in such a manner that these not only mechanically hold and guide the respective wire ends (or wire diversions), it also becomes clear (cf. in particular the side view of FIG. 3), that elongated high-voltage insulators 36 or 38 fastened thereon are lifted upwards from the common plane of diverted line section and wire ends 16, 18, therefore no current-collector contact with these insulators can occur during driving operation.

The line guidance of the line sections explained for the left-side contact-wire connecting head 12 (FIG. 1) likewise takes place for the contact-wire connecting head 14 (on the right side in the figure), wherein the diverted line section 24 is guided by a connector node 40 to the connecting head 14, diverted there by a deflecting roller (see below) and via a diverting contact 42 to a second transverse strut 44 up to a further connector node 46, from wherein, in the form of a further diagonal line 48, the wire section, which is preferably constructed continuously and in one piece, is guided back to the connector node 44.

FIGS. 1 to 3 show additionally (and in an otherwise known manner) spark conductors 50 provided on the connector nodes at both ends of the insulators 36 or 38 in each case.

The constructive realization of the contact-wire connecting heads 12 or 14 is explained in detail on the basis of FIGS. 5 to 8. These consist of an elongated body 60 made from a metal material, in the underside of which a longitudinal groove 62 is introduced (e.g. by milling), undercut and in accordance with a cross-sectional contour of the contact-wire end to be provided. The inserted free end of the contact wire (e.g. 16 in FIG. 1) can be suitably fastened through the recognizable undercut using four clamping screws 64.

A level equalization device (level equalization means) is provided in the form of a height-adjustable accommodating and diverting roller 66 in an end region, the diameter of which is widened, of the elongated body 60 of the contact-wire connecting head, recognizable in particular in the side illustration of FIG. 6, the height of which level equalization device can be adjusted by means of a screw thread, adjustable using an actuating section 68, in a transverse direction to the longitudinal extent of the body 60 (and therefore in a vertical direction in the figure plane of FIG. 6); a union nut and locking nut 70 is then used for fixing in a found setting position. The roller 66 mounted in a rotatable manner at the end side of the threaded section has a running or diversion section 72, about which the diverted line section 20 (or 24) is guided.

By means of actuation at the screw section 68, a height adjustment of the roller 66 correspondingly takes place, with the possibility of precisely aligning the line section guided and diverted in the section 72 to a height of the line end 16 held in the groove 62 (and completely inserted into the same), so that in this manner, a seamless, virtually interruption-free transition can take place.

A further adjustment (directed upwards in the figure plane of FIG. 6) of the roller 66 then brings the same out of an overlap region 74 of the housing body 60, so that, for mounting purposes, the diverted line section can easily be taken off or put on. By contrast, in the case of a correspondingly inserted (retracted) adjustment state of the roller 66, this line section is effectively secured against falling out by means of the arcuate housing section 74 (cf. in particular also the bottom view of FIG. 8), so that in a constructively simple manner, securing of the diverted line section or the end of the line section arrangement formed therewith is ensured at the head 60.

Figure 4:
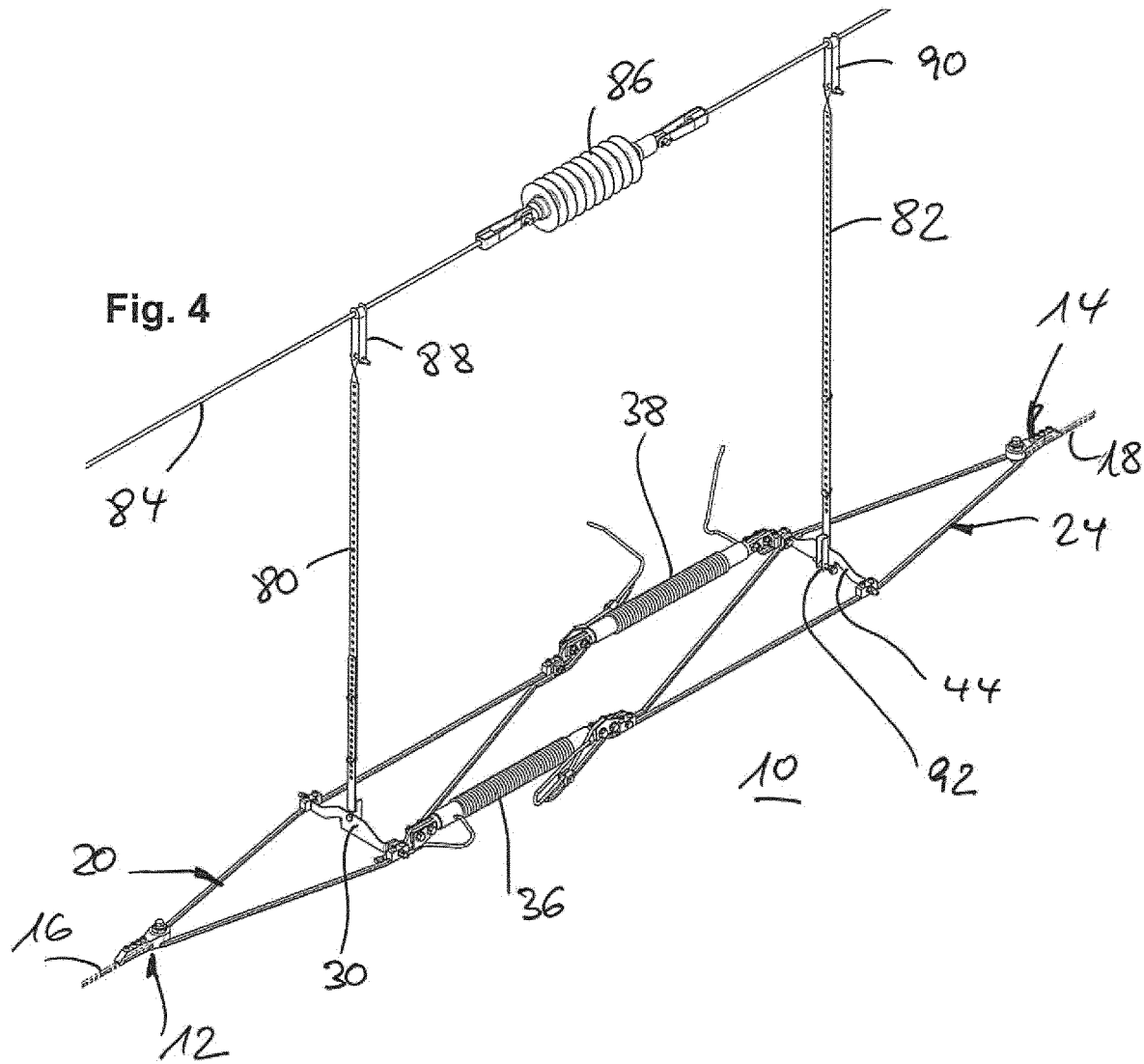
FIG. 4 shows a perspective view analogous to FIG. 1 for illustrating a development of the exemplary embodiment, in which the section disconnect device is suspended on a carrier wire.

The variant of FIG. 4 clarifies a development of the described exemplary embodiment, wherein initially the line section arrangement 10 in FIG. 4 corresponds identically to that of FIG. 1.

In addition, FIG. 4 shows how vertical carriers 80, 82 (usually realized in the form of multi-part and as a result length-adjustable punched strips) acting centrally on the transverse struts 30 or 44 produce a connection to a carrier-wire arrangement 84 guided above the section disconnect device and parallel to the same (the carrier-wire arrangement is, analogously to the section disconnect device and the division into sectors effected therewith, provided with a high-voltage central insulator 86). Actually, the vertical carriers 80, 82 act on a central position of the spreading struts 30 or 44 forming a pivot axis and have hook-like fastening sections 88 or 90 at the other end, which allow fastening on the carrier wire 84 by throwing or hanging over (and therefore in the mechanically and constructively simplest manner). In the region of the respective spreading struts 30, 44, adjustment means 92 realized by means of screw threads, which can be seen indicatively in the figures, ensure that the alignment between a transverse extent of the struts 30 or 44 and the assigned vertical carriers 80, 82 can be adjusted out of squareness, with the effect that an inclination or tilting of the line section arrangement shown is enabled.

To mount the section disconnect device shown in the exemplary embodiments, an installer would first separate the contact line at the separation point provided and produce corresponding exposed ends 16 or 18 (suitably cut to length if appropriate). At these, the fastening of the head 12 (or 14) can then take place by insertion into the groove 62 and subsequent fastening of the clamping screws 64.

The operating person would then premount the line section arrangement, consisting of the diverted line sections, the plurality of connector nodes, the insulators and the spreading struts 30, 44, lower the respective rollers 66 of the heads 12, 14 for accommodating the diverted line section and fasten the line section arrangement between the pair of contact-wire connecting heads by hanging and subsequent lifting of the rollers 66 until the overlap region 74 of the respective contact-wire connecting head body 60. Subsequently, it is then possible, in accordance with the level of the contact-wire ends 16 or 18 (also for taking account of any wear or abrasion state) to carry out the level equalization by fine adjustment of the screw actuation 68, whereupon this position can then be fixed securely by means of a lock screw 70. Fastening on the carrier wire 84 (FIG. 4) takes place by mounting and hanging the vertical carrier 80 or 82 (wherein the carrier wire has also been provided with the insulator 86).

In the described manner, the section disconnect device according to the invention in the described exemplary embodiment can be mounted in an extremely time-saving manner, with simple mounting steps and handles at the same time, so that only a minimal interruption of driving operation is required and in particular even reliable mounting under poor environmental conditions, for example at night, is possible in a simplified manner.

The invention claimed is:

1. A section disconnect device for a contact line assigned to railborne vehicles as overhead line and carrying high voltage, comprising:
a line section arrangement (10) with multi-section extending, said line section arrangement being configured to be tensioned between two contact-wire connecting heads (12, 14) and provided with insulator means (36, 38), said line section arrangement being constructed being mountable by means of respective accommodating sections (66) of the contact-wire connecting heads in an electrically and mechanically contacting manner between free ends (16, 18) of the contact line, wherein, at least one of the contact-wire connecting heads (12, 14) has adjustable level equalization means (66, 68, 70) for interacting with a head-side end (20, 24) of the line section arrangement (10), which are constructed in such a manner that, with respect to a current-collector-contact side of the contact line and/or a current-collector-contact plane, the free end of the contact line is configured to be brought into a common plane with the end of the line section arrangement and/or seamlessly aligned with the same, wherein the end of the line section arrangement is constructed as a continuous, diverted line section (20, 24), which is guided around a roller (66) or a circular section and/or ring section of the level equalization means for forming a spread, and wherein the roller or the circular section or ring section is configured to be adjusted along an adjustment axle.

2. The device according to claim 1, wherein the adjustment axle is provided in an end section of the contact-wire connecting head, which is constructed in an elongated manner and in this contact-wire connecting head, a groove (62) is constructed for accommodating the free end (16, 18), which groove extends along a direction of extent of the contact-wire connecting head, and is provided with clamping means (64).

3. The device according to claim 2, wherein the groove is undercut.

4. The device according to claim 1, wherein the roller (66) or the circular or ring section, for mounting the line section arrangement, in particular for the state of the contact-wire connecting head, in which the line section arrangement is fastened on the exposed end of the contact line, is configured to be guided out of overlap (74) with a body (60) of the contact-wire connecting head in such a manner that the end of the line section arrangement is inserted into the roller or into the circular or ring section and is secured against falling off by a subsequent backward movement.

5. The device according to claim 1, wherein preferably multiple parallel arranged single line sections of the line section arrangement are looped in high-voltage insulator means (36, 38), which are constructed in an elongated manner, and which are separated from each other along a direction of extent of the line section arrangement and are arranged outside of an overlap with one another.

6. The device according to claim 5, wherein high-voltage insulator means connected to one of the contact-wire connecting heads are connected to one another by means of a diagonal line section (34, 48).

7. The device according to claim 6, wherein the diagonal line section is constructed as an extending line section which continuously extends the diverted line section (20, 24).

8. The device according to claim 1, wherein at one end of the continuous, diverted line section (20, 24), a connector node (16, 40) is constructed, which connects the diverted line section to high-voltage insulator means (36, 38) of a first single line section of the line section arrangement.

9. The device according to claim 8, wherein strut- and/or bar shaped-like spreading means (30, 44) act at the connection nodes for predetermining the spread of the diverted line section with one end, which at the other end effect an additional diversion of the line section of a second single line section adjacent to and/or opposite the first single line section.

10. The device according to claim 9, wherein the spreading means are held on a carrier arrangement (84), particularly carrier wire, which is configured to be provided essentially parallel to the line section arrangement.

11. The device according to claim 10, wherein the spreading means is connected in such a manner to the carrier arrangement constructed as a carrier wire via elongated vertical carrier means (80), that an end of the vertical carrier means opposite the spreading means can produce a throw-over connection and/or hanging connection (88, 90).

12. The device according to claim 10, wherein the spreading means are provided with adjustable tilting and/or pivoting means, which enable an adjustable pivoting or tilting of the first and/or the second single line section, particularly about an axis running transversely to a direction of extent of the spreading means.

13. The use of the section disconnect device according to claim 1 for realizing a section insulator for an overhead-line system which is configured to be operated with a driving AC voltage of up to 27 kV.

14. The device according to claim 1, wherein the adjustment axle is constructed perpendicularly to the common plane.

* * * * *